United States Patent
Cai et al.

(10) Patent No.: US 11,501,083 B2
(45) Date of Patent: *Nov. 15, 2022

(54) FACILITATING AUTOMATIC DETECTION OF RELATIONSHIPS BETWEEN SENTENCES IN CONVERSATIONS

(71) Applicant: International Business Machines Corporation, Armonk, NY (US)

(72) Inventors: Ke Ke Cai, Beijing (CN); Jing Ding, Shanghai (CN); Zhong Su, Beijing (CN); Chang Hua Sun, Beijing (CN); Li Zhang, Beijing (CN); Shi Wan Zhao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 34 days.

This patent is subject to a terminal disclaimer.

(21) Appl. No.: 17/133,965

(22) Filed: Dec. 24, 2020

(65) Prior Publication Data

US 2021/0117626 A1   Apr. 22, 2021

Related U.S. Application Data

(63) Continuation of application No. 15/793,227, filed on Oct. 25, 2017, now Pat. No. 10,902,205.

(51) Int. Cl.
*G06F 40/30* (2020.01)
*G06N 3/08* (2006.01)
(Continued)

(52) U.S. Cl.
CPC .............. *G06F 40/30* (2020.01); *G06F 40/35* (2020.01); *G06N 3/006* (2013.01); *G06N 3/04* (2013.01);
(Continued)

(58) Field of Classification Search
CPC ...... G06F 40/30; G06F 40/35; G06F 17/2785; G06F 17/279; G06F 17/2881;
(Continued)

(56) References Cited

U.S. PATENT DOCUMENTS 8,626,509 B2   1/2014   Roy et al.
9,348,817 B2   5/2016   Bohra et al.
(Continued)

OTHER PUBLICATIONS

Yao et al., An Attentional Neural Conversation Model with Improved Specificity, published Jun. 3, 2016, computer science, ArXiv, (Year: 2016).*

(Continued)

*Primary Examiner* — Abdelali Serrou
(74) *Attorney, Agent, or Firm* — Amin, Turocy & Watson, LLP

(57) ABSTRACT

Techniques are provided for training, by a system operatively coupled to a processor, an attention weighted recurrent neural network encoder-decoder (AWRNNED) using an iterative process based on one or more paragraphs of agent sentences from respective transcripts of one or more conversations between one or more agents and one or more customers, and based on one or more customer response sentences from the respective transcripts, and generating, by the system, one or more groups respectively comprising one or more agent sentences and one or more customer response sentences selected based on attention weights of the AWRNNED.

20 Claims, 13 Drawing Sheets

(51) Int. Cl.
*H04M 3/51* (2006.01)
*G06N 3/04* (2006.01)
*G06N 3/00* (2006.01)
*G06F 40/35* (2020.01)

(52) U.S. Cl.
CPC .......... *G06N 3/0445* (2013.01); *G06N 3/0454* (2013.01); *G06N 3/08* (2013.01); *H04M 3/5183* (2013.01); *H04M 2203/357* (2013.01)

(58) Field of Classification Search
CPC ...... G06F 16/2423; G06F 17/18; G06F 17/21; G06F 17/2735; G06F 17/175; G06F 17/246; G06F 17/248; G06F 17/271; G06F 17/2715; G06F 17/2745; G06F 17/276; G06F 17/28; G06F 17/2818; G06F 17/2845; G06F 17/2854; G06F 17/2863; G06N 3/006; G06N 3/04; G06N 3/0445; G06N 3/0454; G06N 3/08; H04M 3/5183; H04M 2203/357
See application file for complete search history.

(56) References Cited

U.S. PATENT DOCUMENTS

| | | | |
|---|---|---|---|
| 9,911,413 | B1 | 3/2018 | Kumar et al. |
| 10,083,169 | B1 | 9/2018 | Ghosh et al. |
| 10,181,098 | B2 | 1/2019 | Vinyals et al. |
| 10,332,508 | B1 | 6/2019 | Hoffmeister |
| 10,388,274 | B1 | 8/2019 | Hoffmeister |
| 2007/0220597 | A1 | 9/2007 | Ishida |
| 2010/0104086 | A1 | 4/2010 | Park |
| 2011/0206198 | A1 | 8/2011 | Freedman et al. |
| 2011/0238409 | A1 | 9/2011 | Larcheveque et al. |
| 2013/0006633 | A1* | 1/2013 | Grokop .................. G10L 15/063 704/245 |
| 2013/0066870 | A1 | 3/2013 | Somasundaran et al. |
| 2016/0078020 | A1 | 3/2016 | Sumita et al. |
| 2017/0116173 | A1* | 4/2017 | Lev-Tov ............... H04M 3/493 |
| 2017/0118336 | A1 | 4/2017 | Tapuhi et al. |
| 2017/0127016 | A1 | 5/2017 | Yu et al. |
| 2017/0270919 | A1 | 9/2017 | Parthasarathi et al. |
| 2017/0337364 | A1 | 11/2017 | Whaley et al. |
| 2017/0358295 | A1 | 12/2017 | Roux et al. |
| 2018/0143760 | A1* | 5/2018 | Orr ....................... G06F 3/0233 |
| 2018/0150743 | A1 | 5/2018 | Ma et al. |
| 2018/0203852 | A1 | 7/2018 | Goyal et al. |
| 2018/0261225 | A1 | 9/2018 | Watanabe et al. |
| 2018/0329884 | A1 | 11/2018 | Xiong et al. |
| 2018/0374486 | A1 | 12/2018 | Zhao et al. |
| 2019/0005090 | A1 | 1/2019 | Zhang et al. |
| 2019/0042210 | A1 | 2/2019 | Gaunt et al. |
| 2020/0183963 | A1* | 6/2020 | Ghaeini ............... G06F 16/3334 |

OTHER PUBLICATIONS

ACM, Inc., "Data mining approach for analyzing call center performance," Jun. 7, 2017, 2 pages.

Britz, "Recurrent Neural Networks Tutorial, Part 1—Introduction to RNNs," Artificial Intelligence, Deep Learning, and NLP, Sep. 17, 2015, 7 pages.

Cho, et al., "Learning Phrase Representations using RNN Encoder-Decoder for Statistical Machine Translation," arXiv:1406.1078v3 [cs.CL] Sep. 3, 2014, 15 pages.

Bahdanau, et al.,"Neural Machine Translation by Jointly Learning to Align and Translate," arXiv:1409.0473v7 [cs.CL] May 19, 2016, 15 pages.

Non-Final Office Action for U.S. Appl. No. 15/793,227 dated Jun. 19, 2019, 21 pages.

Yao et al., "An Attentional Neural Conversation Model with Improved Safety," NIPS Workshop on Machine Learning for Spoken Language Understanding and Interaction; arXiv:1606.01292v1, Nov. 5, 2015, 11 pages.

Final Office Action for U.S. Appl. No. 15/793,227 dated Oct. 3, 2019, 17 pages.

Non-Final Office Action for U.S. Appl. No. 15/793,227 dated Mar. 20, 2020, 20 pages.

Notice of Allowance for U.S. Appl. No. 15/793,227 dated Sep. 30, 2020, 26 pages.

* cited by examiner

FACILITATING AUTOMATIC DETECTION OF RELATIONSHIPS BETWEEN SENTENCES IN CONVERSATIONS

BACKGROUND

The subject disclosure relates generally to automatically detecting relationships between specific agent sentences and specific customer response sentences in an agent-customer conversation.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. One or more embodiments described herein include a system, computer-implemented method, and/or computer program product, in accordance with the present invention.

According to an embodiment, a system is provided. The system comprises a memory that stores computer executable components; and a processor that executes the computer executable components stored in the memory. The computer executable components can comprise: a model generation component that trains an attention weighted recurrent neural network encoder-decoder (AWRNNED) using an iterative process based on one or more paragraphs of agent sentences from respective transcripts of one or more conversations between one or more agents and one or more customers, and based on one or more customer response sentences from the respective transcripts; and a grouping component that generates one or more groups respectively comprising one or more agent sentences and one or more customer response sentences selected based on attention weights of the AWRNNED.

The computer executable components can also comprise a performance component that determines an effectiveness of an agent based upon an analysis of one or more conversations of the agent using the trained AWRNNED. This provides a benefit over prior art in that relationships between agent sentences and customer response sentences can be automatically determined and employed to evaluate effectiveness of an agent.

The computer executable components can also comprise a recommendation component that generates, during an ongoing conversation between an agent and a customer, a recommendation to the agent of an agent sentence to employ to elicit a particular customer response sentence based upon an analysis of the ongoing conversation using the trained AWRNNED. This provides a benefit over prior art in that an agent can be provided real-time recommendation of agent sentences to employ that can direct the conversation in a direction to satisfy a goal of the conversation.

In another embodiment, a computer-implemented method is provided. The computer-implemented method can include training, by a system operatively coupled to a processor, an attention weighted recurrent neural network encoder-decoder (AWRNNED) using an iterative process based on one or more paragraphs of agent sentences from respective transcripts of one or more conversations between one or more agents and one or more customers, and based on one or more customer response sentences from the respective transcripts, and generating, by the system, one or more groups respectively comprising one or more agent sentences and one or more customer response sentences selected based on attention weights of the AWRNNED.

In another embodiment, a computer program product for training an attention weighted recurrent neural network encoder-decoder (AWRNNED) is provided. The computer program product can include a computer readable storage medium having program instructions embodied therewith. The program instructions can be executable by a processor to cause the processer to: train the AWRNNED using an iterative process based on one or more paragraphs of agent sentences from respective transcripts of one or more conversations between one or more agents and one or more customers, and based on one or more customer response sentences from the respective transcripts, and generate one or more groups respectively comprising one or more agent sentences and one or more customer response sentences selected based on attention weights of the AWRNNED.

DETAILED DESCRIPTION

Figure 1:
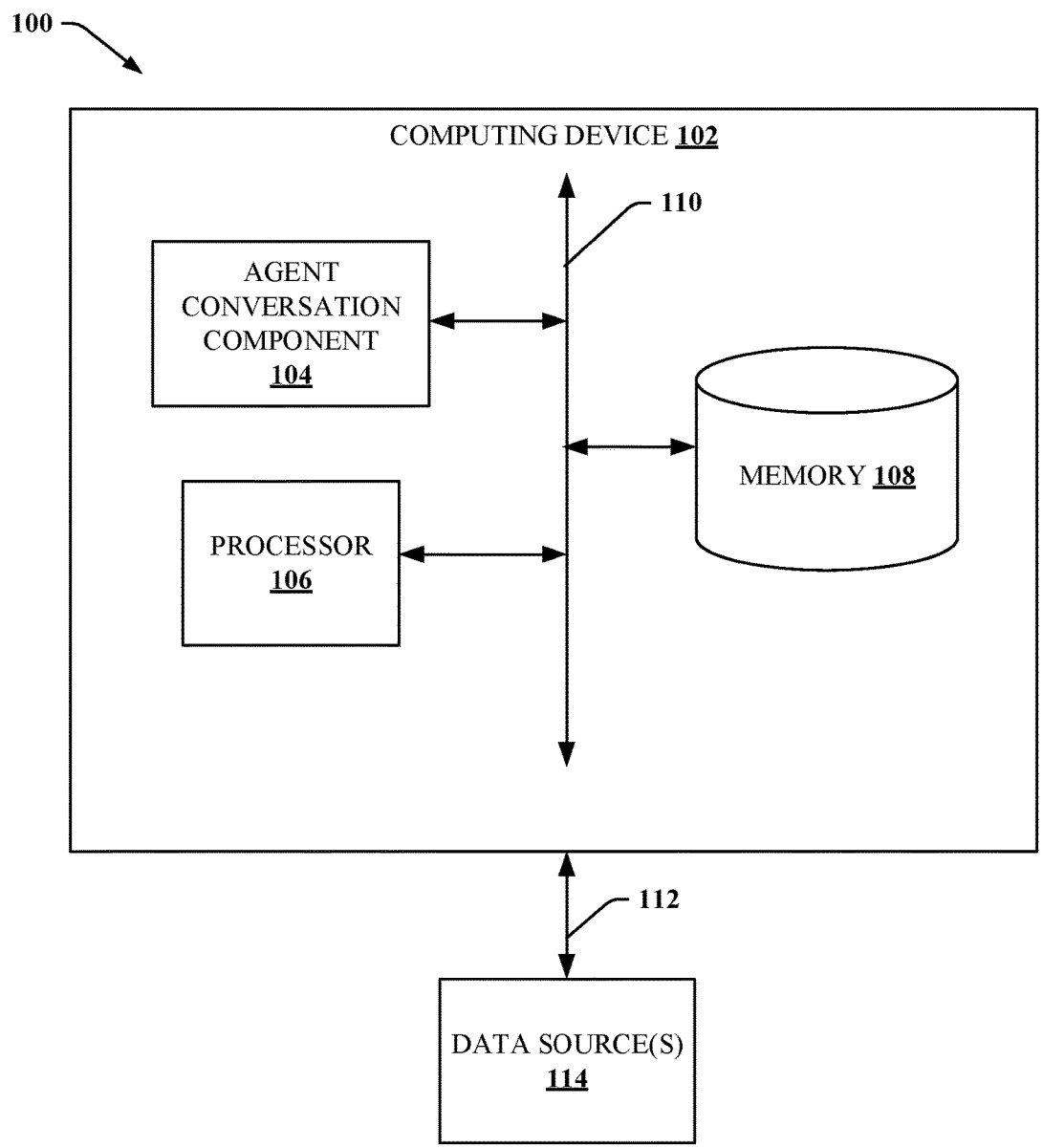
FIG. 1 illustrates a block diagram of an example, non-limiting system in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however in various cases, that the one or more embodiments can be practiced without these specific details.

Conversations between an agent and a customer are often scripted with a manager evaluating the agent based upon their ability to follow the script or employ specific keywords. The agent receives training by listening to recorded calls of other agents which a manager felt were good examples of an interaction with the customer. These mechanisms for training an agent are subjective and time consuming.

To address the challenges in agent training as described herein, one or more embodiments of the invention can employ an Attention Weighted Recurrent Neural Network (AWRNN) model to automatically analyze conversations between an agent and a customer to identify relationships between agent sentences and customer response sentences. For example, agent sentences that are effective at eliciting specific response sentences from the customer can be identified using an AWRNNED. In an example, agent sentences that trigger positive responses can be identified, as well as, agent sentences that trigger negative responses can be identified. Using these identifications, agents can be trained on what to say and what not to say. That is, one or more embodiments herein can improve training of an agent using analysis of other agents' conversations, as well as, conversations of the agent being trained. In addition, an agent's conversation can be monitored in real-time and recommendations on sentences to say and sentences to avoid can be provided to the agent in real-time during the conversation to steer the conversation in a particular direction with respect to customer responses. In another non-limiting example, an agent's performance can be determined by automatically analyzing the agent's conversations using an AWRNNED.

One or more embodiments of the subject disclosure is directed to computer processing systems, computer-implemented methods, apparatus and/or computer program products that facilitate efficiently, effectively, and automatically (e.g., without direct human involvement) analyzing conversations between agents and customers to identify relationships between agent sentences and customer response sentences, train agents, evaluate performance of agents, and provide real-time recommendations of sentences to use and not use during an ongoing conversation. The computer processing systems, computer-implemented methods, apparatus and/or computer program products can employ hardware and/or software to solve problems that are highly technical in nature (e.g., adapted to generate and/or employ one or more different detailed, specific and highly-complex attention weighted recurrent neural network encoder-decoder models that can automatically analyze an agent-customer conversation to detect relationships between agent sentences and customer response sentences) that are not abstract and that cannot be performed as a set of mental acts by a human. For example, a human, or even thousands of humans, cannot efficiently, accurately and effectively manually gather and analyze thousands of data elements related to a variety of observations in a real-time network based computing environment to analyze conversations between agents and customers to identify relationships between agent sentences and customer response sentences, train agents, evaluate performance of agents, and provide real-time recommendations of sentences to use and not use during an ongoing conversation. One or more embodiments of the subject computer processing systems, methods, apparatuses and/or computer program products can enable the automated analysis of conversations between agents and customers to identify relationships between agent sentences and customer response sentences, training of agents, evaluations of performance of agents, and providing of real-time recommendations of sentences to use and not use during an ongoing conversation using artificial intelligence in a highly accurate and efficient manner to achieve one or more goals. By employing an Attention Weighted Recurrent Neural Network Encoder-Decoder (AWRNNED) model and artificial intelligence, the processing time and/or accuracy associated with the automated conversation analysis, agent training, agent performance evaluation, and real-time recommendation systems is substantially improved. Additionally, the nature of the problem solved is inherently related to technological advancements in artificial intelligence based conversation analysis that have not been previously addressed in this manner. Further, one or more embodiments of the subject techniques can facilitate improved performance of automated conversation analysis, agent training, agent performance evaluation, and real-time recommendations that provides for more efficient usage of storage resources, processing resources, and network bandwidth resources to provide highly granular and accurate conversation analysis, agent training, agent performance evaluation, and real-time recommendation using artificial intelligence. For example, by allowing for automated conversation analysis, agent training, agent performance evaluation, and real-time recommendations, agent efficiency and effectiveness is improved, and wasted usage of processing, storage, and network bandwidth resources can be avoided by decreasing the length of conversations between agents and customers.

An agent can be a person that is trying to influence a customer during a conversation. In a non-limiting example, an agent can be a customer support person, a salesperson, or any other suitable person that has a conversation in with a customer. In a non-limiting example, a conversation can be an audio conversation (e.g., in-person, telephonic, or any other suitable audio conversation), a text conversation (e.g., email, chat, text message, or any other suitable text conversation), or any other suitable conversation between an agent and a customer. In another non-limiting example, a sentence can be a sentence, a phrase, a clause, a statement, or any other suitable grouping of words from a person of a conversation. In a further non-limiting example, a paragraph can be a group of one or more sentences from a person of a conversation.

By way of overview, aspects of systems, apparatuses, or processes in accordance with the present invention can be implemented as machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

Figure 2:
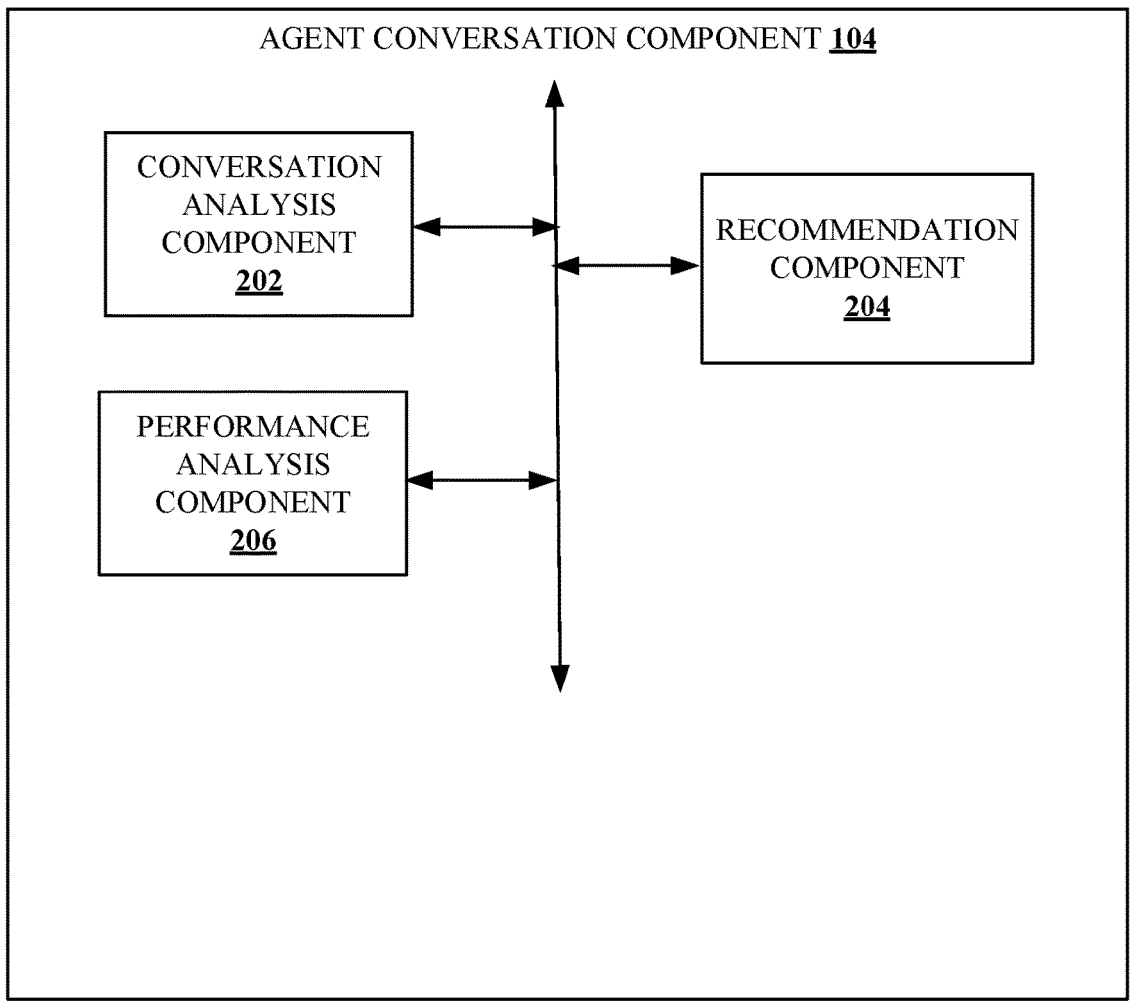
FIG. 2 illustrates a block diagram of an example, non-limiting agent conversation component in accordance with one or more embodiments described herein.

FIG. 1 illustrates a block diagram of an example, non-limiting system 100 that facilitates automatically analyzing conversation between agents and customers using an AWRNNED in accordance with one or more embodiments described herein. FIG. 2 illustrates a block diagram of an example, non-limiting agent conversation component 104 in accordance with one or more embodiments described herein. Repetitive description of like elements employed in one or more embodiments described herein is omitted for sake of brevity.

With reference to FIGS. 1 and 2, and as shown in FIG. 1, the system 100 can include a computing device 102, one or more networks 112, and one or more data sources 114. Computing device 102 can include an agent conversation component 104 that can facilitate automatically analyzing conversations between agents and customers using an AWRNNED as discussed in more detail below. Agent conversation component 104 can include conversation analysis component 202 that can automatically analyze conversations between agents and customers, train an AWRNNED based on the analysis, and identify relationships between agent sentences and customer response sentences as discussed in more detail below.

Computing device 102 can also include or otherwise be associated with at least one included (or operatively coupled) memory 108 that can store computer executable components (e.g., computer executable components can include, but are not limited to, the agent conversation component 104 and associated components), and can store any data generated by agent conversation component 104 and associated components. Computing device 102 can also include or otherwise be associated with at least one processor 106 that executes the computer executable components stored in memory 108. Computing device 102 can further include a system bus 110 that can couple the various server components including, but not limited to, the agent conversation component 104, memory 108 and/or processor 106.

Computing device 102 can be any computing device that can be communicatively coupled to one or more data sources 114, non-limiting examples of which can include, but are not limited to, include a wearable device or a non-wearable device Wearable device can include, for example, heads-up display glasses, a monocle, eyeglasses, contact lens, sunglasses, a headset, a visor, a cap, a mask, a headband, clothing, or any other suitable device that can be worn by a human or non-human user. Non-wearable device can include, for example, a mobile device, a mobile phone, a camera, a camcorder, a video camera, laptop computer, tablet device, desktop computer, server system, cable set top box, satellite set top box, cable modem, television set, monitor, media extender device, blu-ray device, digital versatile disc or digital video disc (DVD) device, compact disc device, video game system, portable video game console, audio/video receiver, radio device, portable music player, navigation system, car stereo, a mainframe computer, a robotic device, a wearable computer, an artificial intelligence system, a network storage device, a communication device, a web server device, a network switching device, a network routing device, a gateway device, a network hub device, a network bridge device, a control system, or any other suitable computing device 102. A data source 114 can be any device that can communicate with computing device 102 and that can provide information to computing device 102 or receive information provided by computing device 102. For example, data source 114 can be a device that an agent employs to communicate with a customer. Computing device 102 can obtain information about the conversation from data source 114. In another example, data source 114 can be a server that stores conversations between agents and customers. It is to be appreciated that computing device 102 and data source 114 can be equipped with communication components (not shown) that enable communication between computing device 102, and data source 114 over one or more networks 112.

The various devices (e.g., computing device 102, and data source 114) and components (e.g., agent conversation component 104, memory 108, processor 106 and/or other components) of system 100 can be connected either directly or via one or more networks 112. Such networks 112 can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology.

Figure 4:
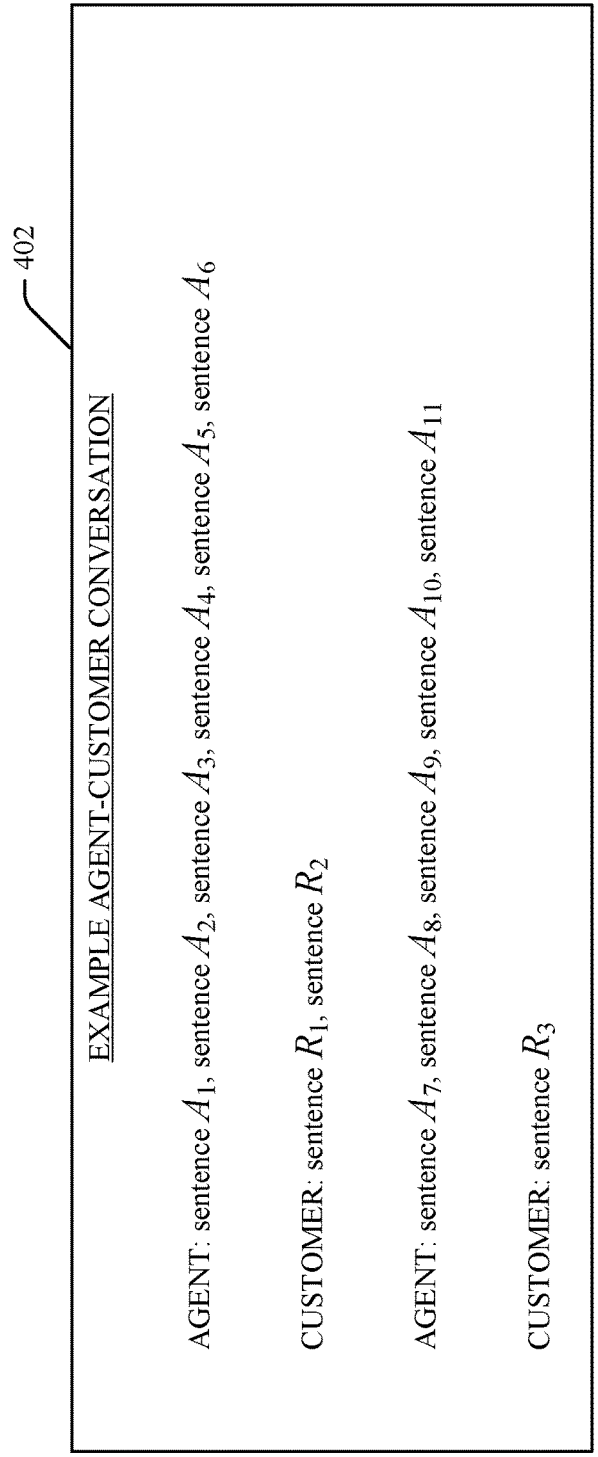
FIG. 4 illustrates a block diagram of an example, non-limiting agent-customer conversation in accordance with one or more embodiments described herein.

FIG. 4 illustrates a block diagram of an example, non-limiting agent-customer conversation 402 in accordance with one or more embodiments described herein. Repetitive description of like elements employed in one or more embodiments described herein is omitted for sake of brevity.

In this non-limiting example, the agent initiates the conversation with agent sentences $A_1$, $A_2$, $A_3$, $A_4$, $A_5$, and $A_6$. Agent sentences $A_1$, $A_2$, $A_3$, $A_4$, $A_5$, and $A_6$ can be a first communication of the agent. The customer responds to the agent's first communication with customer response sentences $R_1$ and $R_2$. Agent sentences $A_1$, $A_2$, $A_3$, $A_4$, $A_5$, and $A_6$ and customer response sentences $R_1$ and $R_2$ can form a first communication exchange between the agent and customer. The agent can then communicate agent sentences $A_7$, $A_8$, $A_9$, $A_{10}$, and $A_{11}$. Agent sentences $A_7$, $A_8$, $A_9$, $A_{10}$, and $A_{11}$ can be a second communication of the agent. The customer responds to the agent's second communication with customer response sentence $R_3$. Agent sentences $A_7$, $A_8$, $A_9$, $A_{10}$, and $A_{11}$ and customer response sentences $R_3$ can form a second communication exchange between the agent and customer. It is to be appreciated that a conversation can comprise any suitable number of agent sentences, customer response sentences, and/or communication exchanges.

Figure 5:
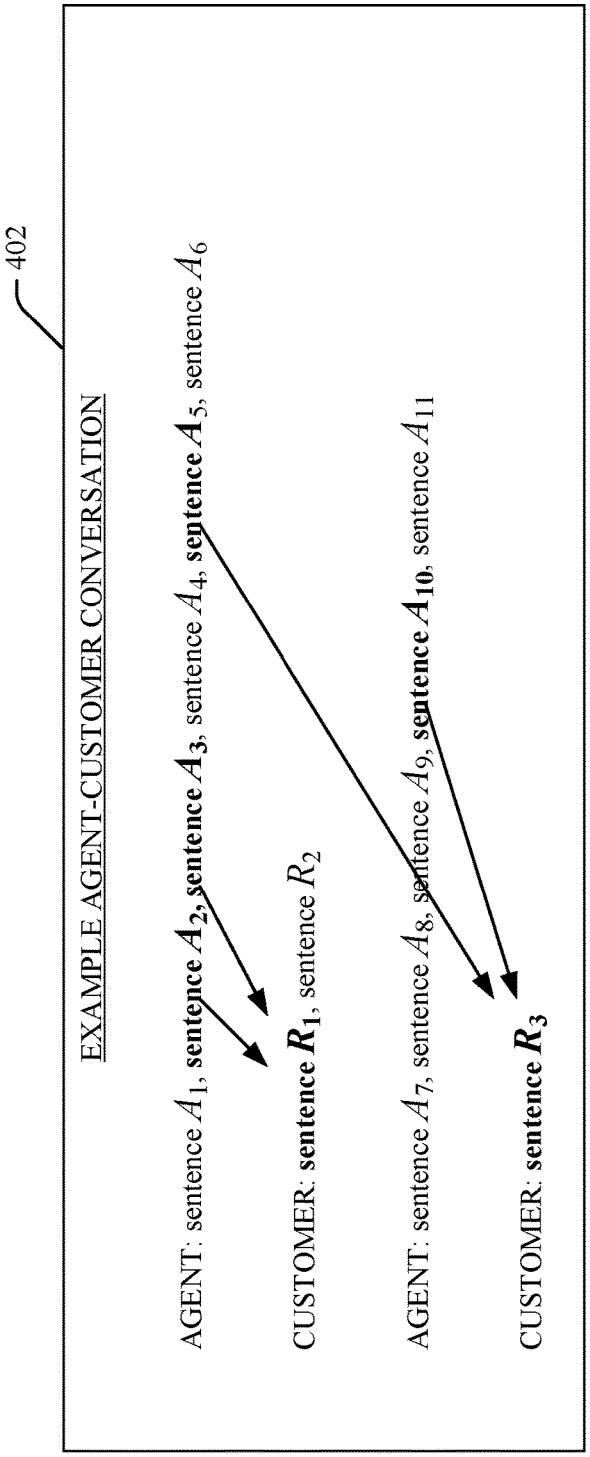
FIG. 5 illustrates a block diagram of an example, non-limiting agent-customer conversation in accordance with one or more embodiments described herein.

With reference to FIGS. 2 and 4, conversation analysis component 202 can analyze conversation 402 to determine customer response sentences that meet defined labeling criteria and which agent sentences lead to the labeled customer response sentences. For example, the defined labeling criteria can be indicative of an effective customer response sentence. Referring to FIG. 5, a block diagram of an example, non-limiting agent-customer conversation 402 after an analysis by conversation analysis component 202 in accordance with one or more embodiments described herein. Conversation analysis component 202 can determine that customer sentences $R_1$ and $R_3$ meet a defined labeling criterion. For example, customer sentences $R_1$ and $R_3$ can be determined to be desired responses from the customer according to a goal of conversation 402. Conversation analysis component 202 can also determine that agent sentences $A_2$ and $A_3$ meet a defined criterion indicative of having a level of influence in eliciting customer sentence $R_1$, and agent sentences $A_6$ and $A_{10}$ meet the defined criterion indicative of having a level of influence in eliciting customer sentence $R_3$. One or more embodiments below describe in greater detail operations of conversation analysis component 202.

Figure 3:
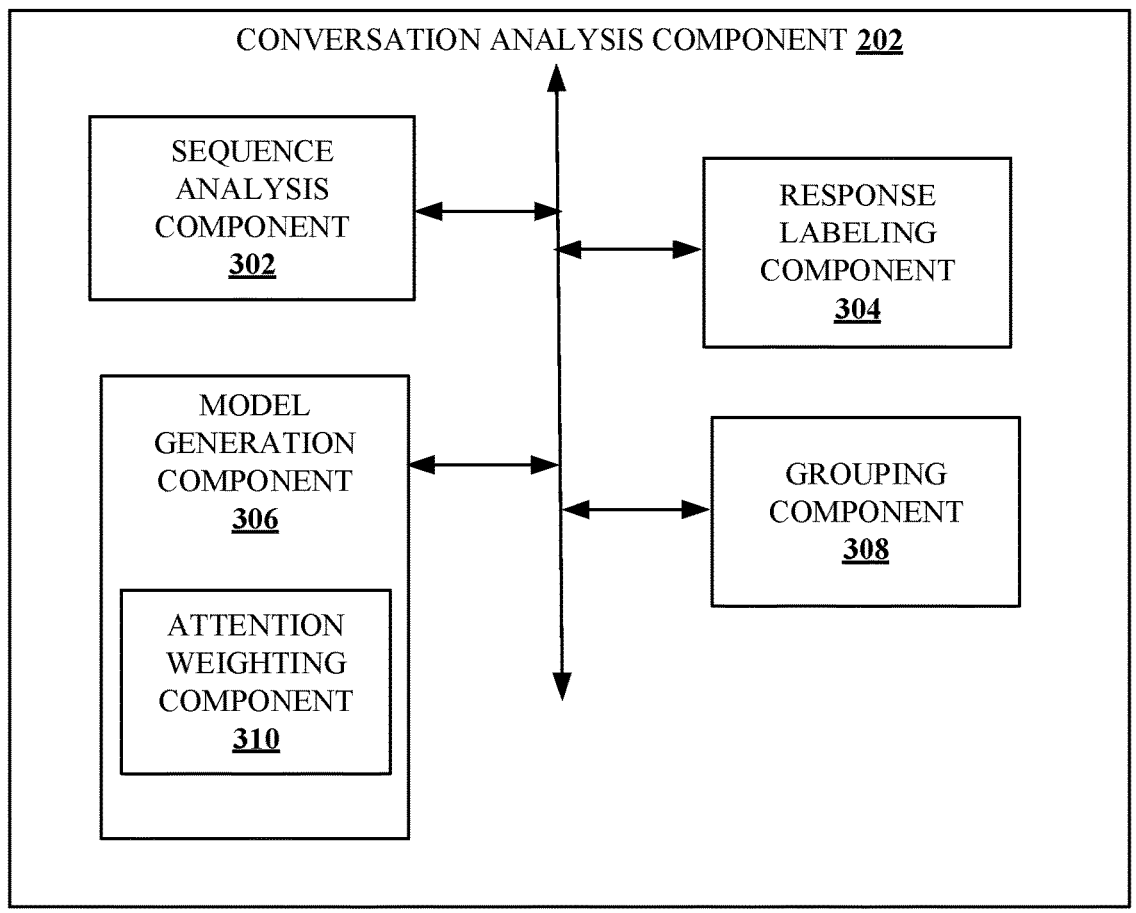
FIG. 3 illustrates a block diagram of an example, non-limiting conversation analysis component in accordance with one or more embodiments described herein.

FIG. 3 illustrates a block diagram of an example, non-limiting conversation analysis component 202 in accordance with one or more embodiments described herein. Repetitive description of like elements employed in one or more embodiments described herein is omitted for sake of brevity.

Conversation analysis component 202 can include sequence analysis component 302 that prepares a conversation for employment by the AWRNNED. Sequence analysis component 302 can generate a text transcript of a conversation. For example, sequence analysis component 302 can employ speech to text recognition to convert an audio conversation into a text transcript. In another example, sequence analysis component 302 can employ optical character recognition to convert an image of a conversation into a text transcript.

Sequence analysis component 302 can filter a text transcript to remove noise from the conversation. In a non-limiting example, noise can be any irrelevant words and/or sentences in the conversation. For example, filler words such as "um", "ah", "you know", "basically", "actually", or any other suitable filler words can be filtered out of the transcript. It is to be appreciated that irrelevant words and/or sentences can be determined based on the information describing the conversation, such as in the non-limiting example, purpose of conversation, type of agent, type of customer, type of relationship between agent and customer, industry of agent and/or customer, or any other suitable information that can be employed to discern irrelevant words and/or phrases in a conversation. Sequence analysis component 302 can also correct spelling errors and/or grammatical errors in the transcript.

Sequence analysis component 302 can label sentences from that agent with an identification as agent sentences, and sentences from the customer with an identification as customer response sentences. It is to be appreciated that any suitable identification can be employed for differentiation between agent sentences and customer response sentences.

Conversation analysis component 202 can include response labeling component 304 that obtains the prepared transcript and labels the customer response sentences and/or words with metadata describing sentiment, emotion, and information-types describing the sentences and/or words. Response labeling component 304 can employ one or more artificial intelligence functions to analyze customer response statements and make determinations regarding sentiment, emotion, and/or information-types being conveyed by the customer response statements. For example, response labeling component 304 can employ a psycholinguistic function to determine metadata related to sentiment, emotion, and/or information-types being conveyed by the customer response statements. For example, a psycholinguistic function can analyze text and make determinations with respect to psychological factors of the author of the text. In a non-limiting example, sentiment provides in an indication of a sentiment (e.g. level of positive and/or level of negative) that the customer is presenting with the customer response sentence, such as positive or negative sentiment. It is to be appreciated that sentiment can be a binary indication, an n-ary indication, or any other suitable indicator of sentiment. In another non-limiting example, emotion provides an indication of emotion that the customer is presenting with the customer response sentence, such as happy, sad, anger, frustrated, trust, surprise, or any other suitable indication of emotion. In a non-limiting example, any suitable standards for emotion indications can be employed, non-limiting examples of which can include Plutchik's wheel of emotion, Eckman's six universal emotions, Cowen and Keltner model, Lövheim cube of emotion, or any other suitable emotion categorization. Information type is a categorization of a word and/or sentence based on the particular domain (e.g. industry, topic, technology, or any other suitable domain) with which the conversation is related. It is to be appreciated that any suitable categorization for information type can be employed. For example, a technology company can have a particular set of categories for information type that is appropriate for the technology in which the company operates, while a retail store can have a different set of categories for information type that is appropriate for the retail space in which they operate. In another example, an insurance company can have a set of categories for information type that is appropriate for the insurance industry. It is to be appreciated that any suitable categorization for information type can be employed based on the domain of the conversation.

Conversation analysis component 202 can include model generation component 306 that generates (e.g. creates, trains, models, etc.) an Attention Weighted Recurrent Neural Network Encoder-Decoder (AWRNNED) model based on analysis of the labeled transcripts of conversations between agents and customers. Model generation component 306 employs an iterative process that concurrently trains encoder recurrent neural networks (RNNs) with attention weights and a decoder RNN of the AWRNNED using sentences of the labeled transcripts as discussed below in more detail with respect to FIGS. 6-9 and 11.

Figure 6:
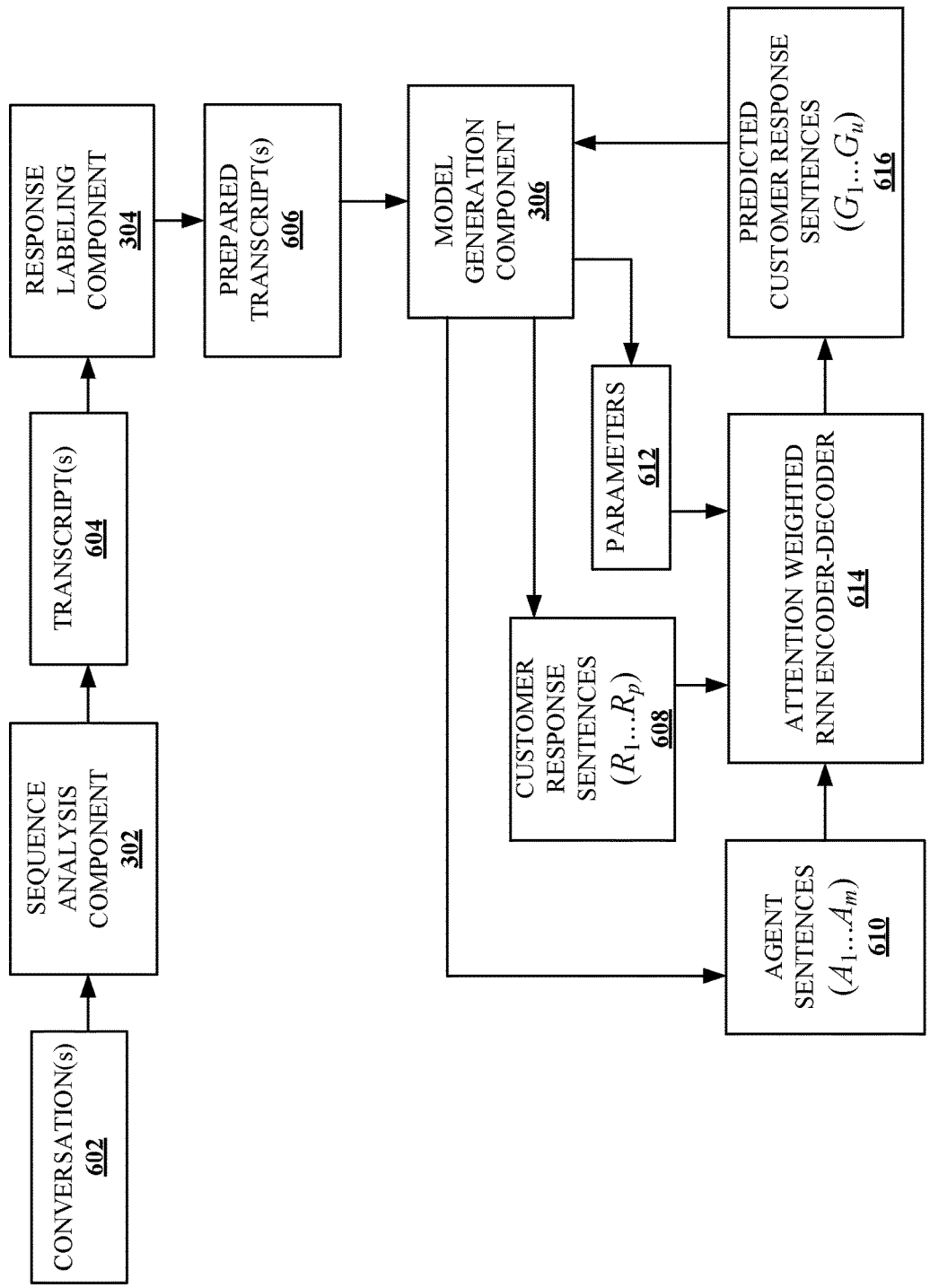
FIG. 6 illustrates a block diagram of an example, non-limiting Attention Weighted Recurrent Neural Network Encoder-Decoder (AWRNNED) model in accordance with one or more embodiments described herein.

FIG. 6 illustrates a block diagram of an example, non-limiting an AWRNNED 614 model training in accordance with one or more embodiments described herein. Repetitive description of like elements employed in one or more embodiments described herein is omitted for sake of brevity.

As discusses above, one or more conversations 602 can be obtained by sequence analysis component to produce one or more transcripts 604. The one or more transcripts 604 can be obtained by response labeling component 304 to produce one or more prepared transcripts 606, which can comprise labeled agent sentences ($A_1 \ldots A_m$) 610 and labeled customer response sentences ($R_1 \ldots R_p$) 608. Model generation component 306 can obtain the one or more prepared transcripts 606 and provides agent sentences ($A_1 \ldots A_m$) and customer response sentences ($R_1 \ldots R_p$) 608 to AWRNNED 614, as well as setting and/or adjusting parameters 612 of AWRNNED 614. AWRNNED 614 can produce predicted customer response sentences ($E_1 \ldots E_u$) 616 which can be compared to customer response sentences ($R_1 \ldots R_p$) 608 by model generation component 306 to determine an error between predicted customer response sentences ($G_1 \ldots G_u$) 616 and customer response sentences ($R_1 \ldots R_p$) 608. Model generation component 306 can employ an iterative process to adjust parameters 612 and determine the error until the error is within a threshold error criterion (e.g., convergence or any suitable error criterion) which represents a satisfactory training of the AWRNNED. It is to be appreciated that m is an integer that represents the number of agent sentences, p is an integer that represents the number of customer response sentences, and u is an integer that represents the number of predicted customer response sentences.

The iterative process that model generation component 306 employs can comprise:
  using a sentence encoder RNN (S-RNN) of AWRNNED to encode agent sentences into respective sentence vectors.
  using a paragraph encoder RNN (P-RNN) of AWRNNED to encode agent sentence vectors associated with agent sentences of one or more paragraphs.
  generating attention weighted vectors for each word of a customer response sentence based on hidden states from P-RNN using an attention weighting component 310 of AWRNNED to generate attention weighted vectors.

using the attention weighted vectors and a decoder RNN (D-RNN) of AWRNNED to predict customer response sentences.

determine an error value for the predicted customer response sentences as compared to the customer response sentences.

if the error value does not meet an error criterion, then employ back propagation to modify one or more parameters of the S-RNN, P-RNN, D-RNN, and/or attention weighting component 310, and repeat the process; otherwise, if the error value meets the error criterion, then the AWRNNED is trained.

Figure 7:
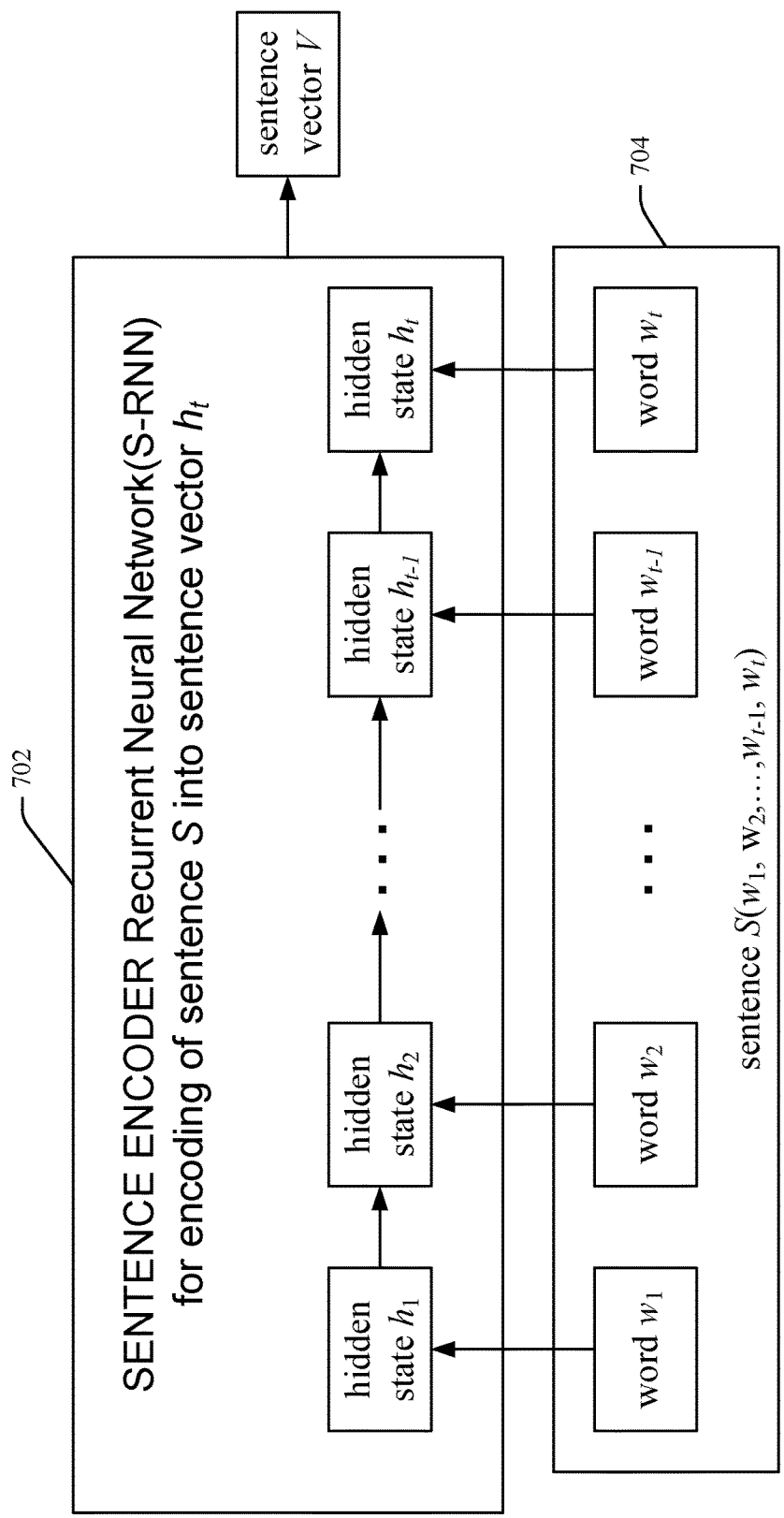
FIG. 7 illustrates a block diagram of an example, non-limiting Sentence Encoder Recurrent Neural Network (S-RNN) in accordance with one or more embodiments described herein.

FIG. 7 illustrates a block diagram of an example, non-limiting operation of a sentence encoder RNN (S-RNN) 702 in accordance with one or more embodiments described herein. Repetitive description of like elements employed in one or more embodiments described herein is omitted for sake of brevity.

S-RNN 702 can obtain a sentence $S(w_1, w_2, \ldots, w_{t-1}, w_t)$ 704. It is to be appreciated that sentence S can be an agent sentence or a customer response sentence, and t is an integer that represents the number of words in sentence S 704. S-RNN 702 can employ an iterative process that goes word by word of sentence S 704 to generate a sentence vector V for sentence S 704. In a non-limiting example, sentence vector V can be determined based on Equation 1.

$$V = h_t = f_w(w_t, h_{t-1}),$$ Equation (1)

where $f_w$ is any suitable function for encoding one or more words into a vector.

For example, S-RNN 702 can obtain word $w_1$ and generate hidden state $h_1$. S-RNN 702 can then obtain word $w_2$ which can be used with hidden state $h_1$ to generate hidden state $h_2$. S-RNN 702 can then obtain word $w_{t-1}$ which can be used with hidden state $h_{t-2}$, to generate hidden state $h_{t-1}$. S-RNN 702 can then obtain word $w_t$ which can be used with hidden state $h_{t-1}$ to generate hidden state $h_t$. S-RNN 702 can output sentence vector V based on hidden state $h_t$. S-RNN 702 can be employed to encode agent sentences $(A_1 \ldots A_m)$ 610 and/or customer response sentences $(R_1 \ldots R_p)$ 608.

Figure 8:
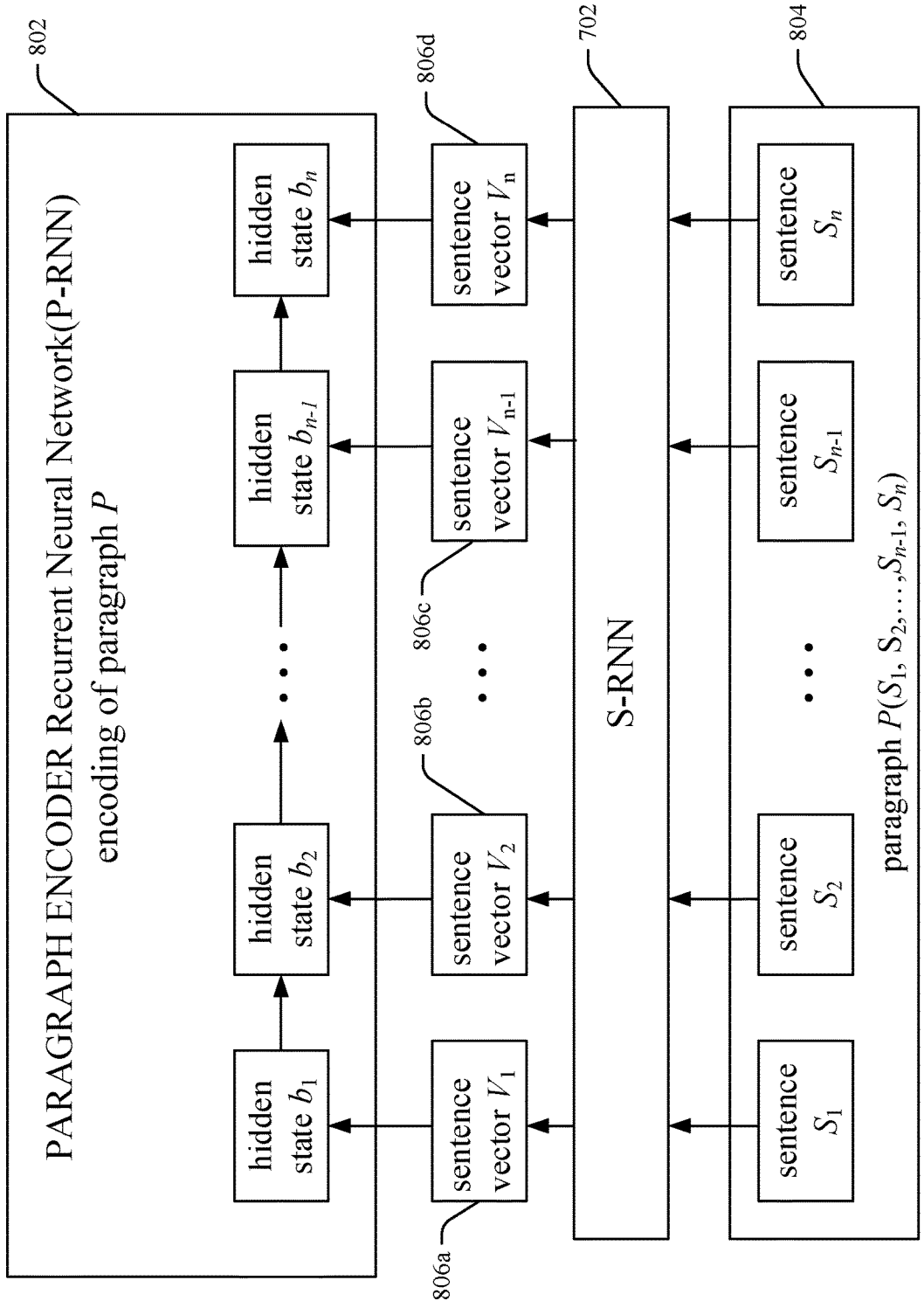
FIG. 8 illustrates a block diagram of an example, non-limiting Paragraph Encoder Recurrent Neural Network (P-RNN) in accordance with one or more embodiments described herein.

FIG. 8 illustrates a block diagram of an example, non-limiting operation of a paragraph encoder RNN (P-RNN) 802 in accordance with one or more embodiments described herein. Repetitive description of like elements employed in one or more embodiments described herein is omitted for sake of brevity.

S-RNN 702 can obtain a paragraph $P(S_1, S_2, \ldots, S_{n-1}, S_n)$ 804, where n is an integer that represents the number of sentences in paragraph P 804. S-RNN 702 generate respective sentence vectors $V_1$ 806a, $V_2$ 806b, $V_{n-1}$ 806c, and $V_n$ 806d for sentences $S_1, S_2, \ldots, S_{n-1}, S_n$. P-RNN 802 can employ an iterative process that goes sentence by sentence of paragraph P 804 to encode the sentences of paragraph P 804 and generate hidden states $b_1 \ldots b_n$. In a non-limiting example, encoding by P-RNN 802 can be performed according to Equation 2.

$$b_n = f_s(V_n, b_{n-1})$$ Equation (2)

where $f_s$ is any suitable function for encoding one or more sentences into a vector.

For example, P-RNN 802 can obtain sentence vector $V_1$ 806a and generate hidden state $b_1$. P-RNN 802 can then obtain sentence vector $V_2$ 806b which can be used with hidden state $b_1$ to generate hidden state $b_2$. P-RNN 802 can then obtain sentence vector $V_{n-1}$ 806c which can be used with hidden state $b_{n-2}$ to generate hidden state $b_{n-1}$. P-RNN 802 can then obtain sentence vector $V_n$ 806d which can be used with hidden state $b_{n-1}$ to generate hidden state $b_n$. P-RNN 802 can be employed to encode agent sentences $(A_1 \ldots A_m)$ 610 based on groupings of respective agent sentences into paragraphs P of a conversation.

In a non-limiting example, a paragraph can be employed during training of AWRNNED to predict a customer response sentence R. In an example, a paragraph can comprise only agent sentences preceding a customer response sentence within a single communication exchange. For example, referring back to FIG. 4, agent sentences $A_1, A_2, A_3, A_4, A_5$, and $A_6$ can be can be employed to predict customer response sentences $R_1$ and/or $R_2$, and agent sentences $A_7, A_8, A_9, A_{10}$, and $A_{11}$ can be used to predict customer response sentence $R_3$.

In another example, a paragraph can comprise agent sentences preceding a customer response sentence within a plurality of communication exchanges. For example, referring again to FIG. 4, agent sentences $A_1, A_2, A_3, A_4, A_5, A_6, A_7, A_8, A_9, A_{10}$, and $A_{11}$ can be used to predict customer response sentence $R_3$.

It is to be appreciated that a paragraph can comprise any suitable selection of agent sentences that precede a customer response sentence in a conversation.

Figure 9:
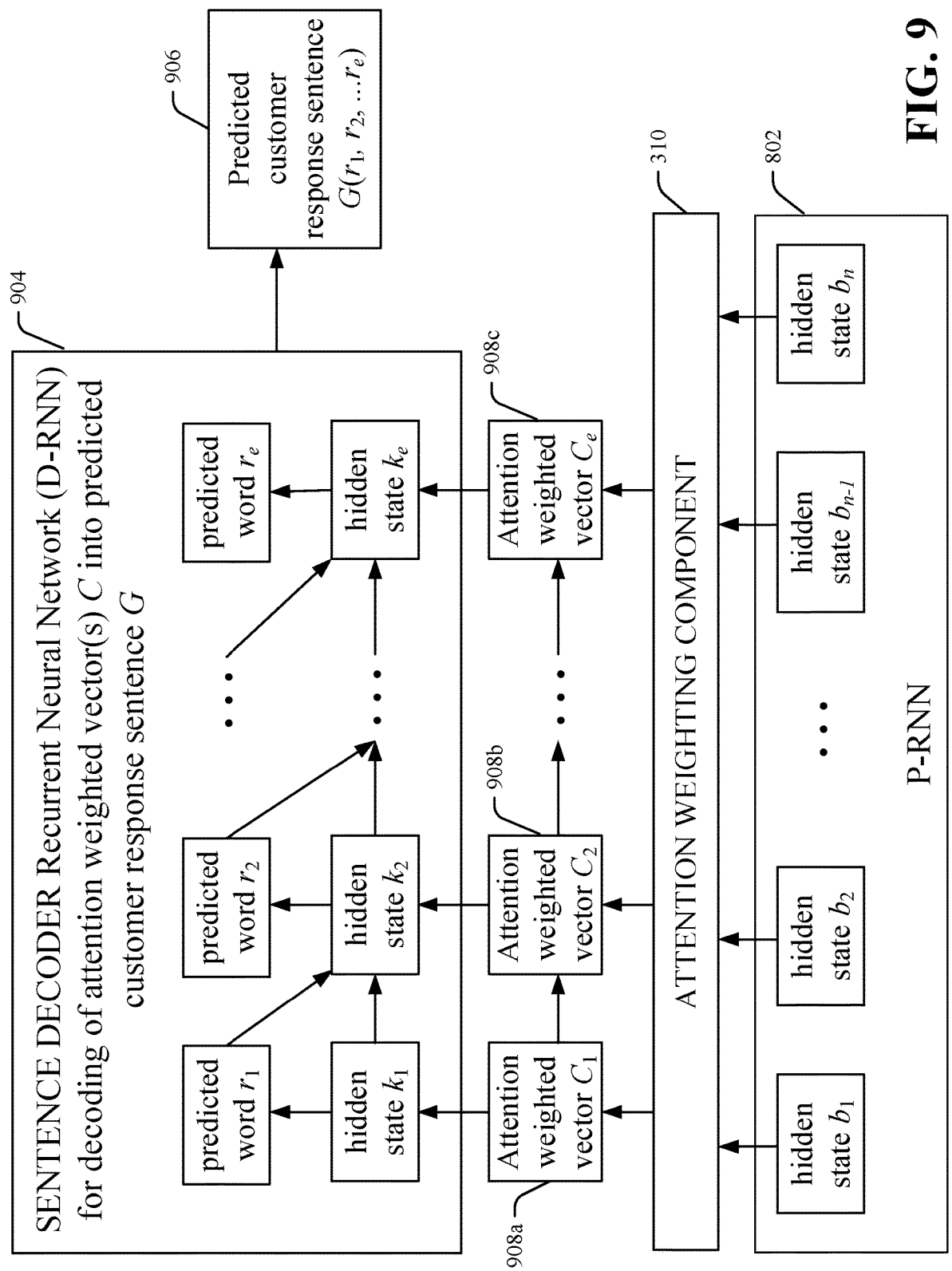
FIG. 9 illustrates a block diagram of an example, non-limiting Decoder Recurrent Neural Network (D-RNN) in accordance with one or more embodiments described herein.

FIG. 9 illustrates a block diagram of an example, non-limiting operation of a sentence decoder RNN (D-RNN) 904 in accordance with one or more embodiments described herein. Repetitive description of like elements employed in one or more embodiments described herein is omitted for sake of brevity. D-RNN 904 can obtain one or more attention weighted vectors C and employ an iterative process that generates predicted words $(r_1, r_2, \ldots, r_e)$ one by one to generate predicted customer response sentence $G(r_1, r_2, \ldots, r_e)$, where e is any suitable integer indicating the number of words in predicted customer response sentence G.

Hidden states $b_1 \ldots b_n$ are generated by P-RNN 802 from paragraph $P(S_1, S_2, \ldots, S_{n-1}, S_n)$ 804. It is to be appreciated that $S_1, S_2, \ldots, S_{n-1}, S_n$ can be agent sentences that precede customer response sentence $R(d_1, \ldots, d_e)$ in a training conversation, where $d_1, \ldots, d_e$ are words of customer response sentence R. It is to be noted that customer response sentence R and predicted customer response sentence G have the same number of words e, and $P(S_1, S_2, \ldots, S_{n-1}, S_n)$ 804 is being employed to train the AWRNNED to predict customer response sentence R.

Model generation component 306 can comprise attention weighting component 310 that employs hidden states $b_1 \ldots b_n$ and customer response sentence $R(d_1, \ldots, d_e)$ to generate respective attention weighted vectors for words $d_1, \ldots, d_e$ of customer response sentence R. For respective words $d_y$ in customer response sentence R, attention weighting component 310 can assign respective attention weights $a_{yz}$ to agent sentences $S_z$ of paragraph P, where y is an integer from 1 to e, and z is an integer from 1 to n. For respective words $d_y$ in customer response sentence R, attention weighting component 310 can determine attention weighted vectors $C_y$ based on the sum of $a_{yz} h_z$ for j equals 1 to n. In a non-limiting example, attention weighted vector $C_y$ for word $d_y$ of customer response sentence R can be determined according to Equation 3.

$$C_y = \Sigma_{j=1}^{n} a_{yz} b_y$$ Equation (3)

Model generation component 306 can employ one or more attention weighted vectors $C_1 \ldots C_e$ as input to D-RNN 904 of AWRNNED to produce predicted customer response sentences ($G_1 \ldots G_n$) 616, where u is an integer that represents the number of predicted customer response sentence $G(r_1, r_2, \ldots, r_e)$. Model generation component 306 can determine an error E between predicted customer response sentence G and customer response sentence R as described in more detail below.

For example, D-RNN 904 can obtain attention weighted vector $C_1$ 908a and generate hidden state $k_1$ and predicted word $r_1$. D-RNN 904 can then obtain attention weighted vector $C_2$ 908b which can be used with hidden state $k_1$ and predicted word $r_1$ to generate hidden state $k_2$ and predicted word $r_2$. D-RNN 904 can then obtain attention weighted vector $C_e$ 908c which can be used with hidden state $k_{e-1}$ and predicted word $r_{e-1}$ to generate hidden state $k_e$ and predicted word $r_e$. In this manner, going word by word, D-RNN 904 can generate predicted customer response sentence $G(r_1, r_2, \ldots, r_e)$. In a non-limiting example, decoding by D-RNN 904 can generate hidden states according to Equation 4.

$$k_e = f_d(C_e, k_{e-1}, r_{e-1}) \quad \text{Equation (4)}$$

where $f_d$ is any suitable function for decoding one or more attention weighted vectors.

Model generation component 306 can generated predicted customer response sentences G for any suitable numbers of paragraphs P and customer response sentences R in a set of training conversations.

For example, referring back to FIG. 6, model generation component 306 can employ attention weighting component 310 to generate one or more attention weighted vectors C from hidden states generated from agent sentences ($A_1 \ldots A_m$) 610 with respect to customer response sentences ($R_1 \ldots R_p$) 608 using AWRNNED. Model generation component 306 can employ one or more attention weighted vectors C as input to D-RNN of AWRNNED to produce predicted customer response sentences ($G_1 \ldots G_u$) 616. Model generation component 306 can compare predicted customer response sentences ($G_1 \ldots G_u$) 616 to corresponding customer response sentences ($R_1 \ldots R_p$) 608, and determine an error E indicative of a difference between predicted customer response sentences ($G_1 \ldots G_u$) 616 and customer response sentences ($R_1 \ldots R_p$) 608 using any suitable error formula. It is to be appreciated that u and p can have equal values in training AWRNNED. For example, a textual comparison of predicted customer response sentences ($G_1 \ldots G_u$) 616 with customer response sentences ($R_1 \ldots R_p$) 608 can be employed to determine error E. In another example, respective sentence vectors associated with predicted customer response sentences ($G_1 \ldots G_u$) 616 can be compared to respective sentence vectors associated with customer response sentences ($R_1 \ldots R_p$) 608 to determine distances between corresponding sentence vectors. It is to be appreciated that any suitable mechanism can be employed to determine error E based on predicted customer response sentences ($G_1 \ldots G_u$) 616 and customer response sentences ($R_1 \ldots R_p$) 608.

Model generation component 306 can compare E to an error criterion $E_c$. It is to be appreciated that error criterion $E_c$ be any suitable criterion indicative of AWRNNED being trained. If E does not meet error criterion $E_c$, model generation component 306 can employ back propagation to modify one or more parameters of the S-RNN, P-RNN, D-RNN, and/or attention weights, and repeat the iterative process. If E meets error criterion $E_c$, model generation component 306 can determine that AWRNNED is trained.

The learned attention weights a of the trained AWRNNED provide indications of the strength of respective relationships between agent sentences and customer response sentences and/or words of the customer response sentences.

For example, as discussed above model generation component 306 can learn attention weights $a_{yz}$ for agent sentences $S_z$ of paragraph P relative to words $d_y$ of customer response sentence R. For respective agent sentences $S_z$ of paragraph P relative to customer response sentence R, attention weighting component 310 can determine respective attention weights $a_{zR}$ based on the sum of $a_{yz}$ for y equals 1 to e. In a non-limiting example, attention weight $a_{zR}$ for agent sentence $S_z$ with respect to customer response sentence R can be determined according to Equation 5.

$$a_{zR} = \Sigma_{y=1}^{e} a_{yz} \quad \text{Equation (5)}$$

In another example, for respective words $d_y$ in customer response sentence R, model generation component 306 can also assign significance weights $g_y$ based on the metadata describing sentiment, emotion, and/or information-types of the customer response sentence R and/or words $d_y$ in the labeled prepared transcript 606. The significance weights $g_y$ can provide an indication of the importance of the customer response sentence R and/or words $d_y$. For respective agent sentences $S_z$ of paragraph P relative to customer response sentence R, attention weighting component 310 can determine respective attention weights $a_{zR}$ based on the sum of $a_{yz} g_y$ for y equals 1 to e. In a non-limiting example, attention weight $a_{zR}$ for agent sentence $S_z$ with respect to customer response sentence R can be determined according to Equation 6.

$$a_{ZR} = \Sigma_{y=1}^{e} a_{yz} g_y \quad \text{Equation (6)}$$

Conversation analysis component 202 can include grouping component 308 that can group pairs of agent sentences and customer response sentences based on the learned attention weights and/or semantic distance. For example, grouping component 308 can group agent sentences that are close to a single customer response sentence based on a threshold with respect to attention weight and/or semantic distance. In another non-limiting example, semantic distance can be determined based on a comparison of sentence vectors generated by S-RNN 702 for customer response sentences and agent sentences. It is to be appreciated that any suitable mechanism can be employed for determining semantic distance between agent sentences and customer response sentences. This can provide an indication of one or more agent sentences that can lead to a particular customer response sentence. In another example, grouping component 308 can group customer response sentences that are close to a single agent sentence based on a threshold with respect to attention weight and/or semantic distance. This can provide an indication of one or more customer response sentences that can result from a particular agent sentence. In a further example, grouping component 308 can create, from a group of group customer response sentence, a subgroup of customer response sentences that fall into a particular category with respect to sentiment, emotion, and/or information-type that are close to a single agent sentence based on a threshold with respect to attention weight and/or semantic distance. This can provide an indication of one or more customer response sentences that fall into particular category with respect to sentiment, emotion, and/or information-type that can result from a particular agent sentence. It is to be appreciated the grouping component can group pairs of agent sentences and customer response sentences into any suitable groups according to any suitable criterion.

Agent conversation component 104 can employ the groupings to automatically generate an output (e.g. a user interface on a display, a report, a document, a chat bot, or any other suitable output) that be employed to train an agent. For example, an agent can be trained using a computer where a display can indicate one or more agent sentences that can lead to a particular customer response sentence, or indicate one or more customer response sentences that can result from a particular agent sentence, or one or more agent sentences that can lead to one or more customer responses that fall into particular category with respect to sentiment, emotion, and/or information-type. In another example, an interactive chat-bot can engage with an agent in training that employs the groupings to simulate customer response sentences based on sentences the agent provides.

Referring back to FIG. 2, agent conversation component 104 can also include recommendation component 204 that can automatically analyze an ongoing conversation between an agent and a customer in real-time using an AWRNNED 614, and provide one or more recommendations to the agent with one or more agent sentences to use and/or avoid in order to steer the conversation in a particular direction with respect to eliciting one or more particular customer response sentences. For example, during the ongoing conversation, agent sentences and customer response sentences can be analyzed using AWRNNED 614 in real-time and agent conversation component 104 can provide an output (e.g., display, audio, or any other suitable output) comprising one or more agent sentences to use and/or avoid in order to steer the ongoing conversation in a particular direction with respect to eliciting one or more particular customer response sentences associated with a goal of the ongoing conversation.

Agent conversation component 104 can also include performance analysis component 206 that can automatically analyze an agent's conversations over a period of time using an AWRNNED 614 to determine the agent's performance. For example, the agent's conversations can be input to AWRNNED 614 to determine relationships between the agent's sentences and the customer response sentences in the agent's conversation. The determined relationship can provide an indication of how effective the agent is at eliciting particular customer response sentences based on the agent's sentences. For example, effectiveness can be based on the quantity of agent sentences needed to elicit a particular customer response sentence, time taken to elicit a particular customer response sentence, usage of the closest one or more agent sentences to the particular customer response sentence according to attention weight and/or semantic distance, or any other suitable measure of effectiveness.

While FIGS. 1, 2, 3, 4, 5, 6, 7, 8, and 9 depict separate components in computing device 102, it is to be appreciated that two or more components can be implemented in a common component. Further, it is to be appreciated that the design of the computing device 102 can include other component selections, component placements, etc., to facilitate automatically analyzing conversation between agents and customers using an AWRNNED in accordance with one or more embodiments described herein. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Further, some of the processes performed can be performed by specialized computers for carrying out defined tasks related to automatically analyzing conversation between agents and customers using an AWRNNED. The subject computer processing systems, methods apparatuses and/or computer program products can be employed to solve new problems that arise through advancements in technology, computer networks, the Internet and the like. The subject computer processing systems, methods apparatuses and/or computer program products can provide technical improvements to systems automatically analyzing conversation between agents and customers using an AWRNNED in a live environment by improving processing efficiency among processing components in these systems, reducing delay in processing performed by the processing components, and/or improving the accuracy in which the processing systems automatically analyzing conversation between agents and customers using an AWRNNED.

The embodiments of devices described herein can employ artificial intelligence (AI) to facilitate automating one or more features described herein. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determination.

A classifier can map an input attribute vector, z=(z1, z2, z3, z4, zn), to a confidence that the input belongs to a class, as by f(z)=confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 10:
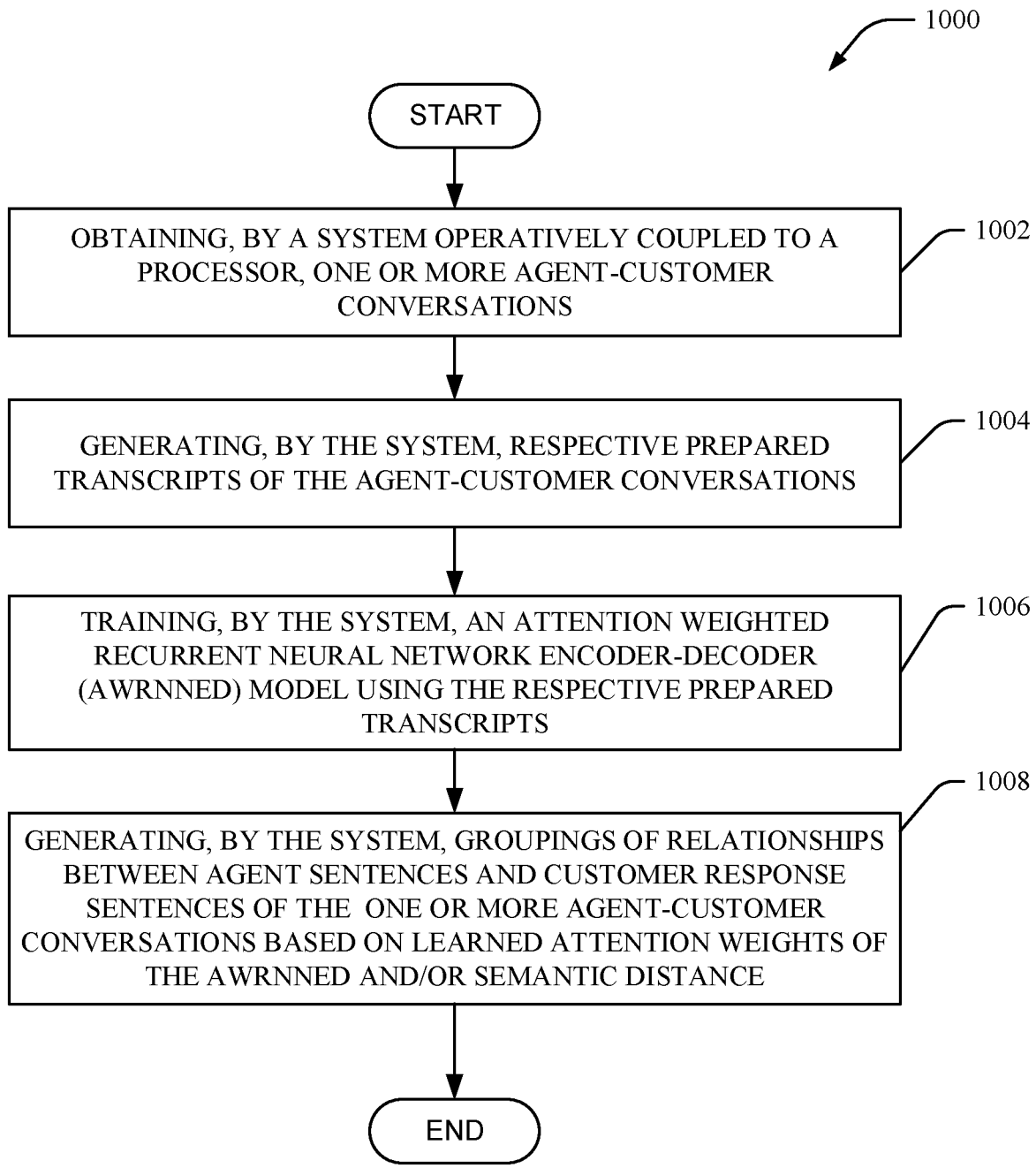
FIG. 10 illustrates a flow diagram of another exemplary, non-limiting computer-implemented method in accordance with one or more embodiments described herein.

FIG. 10 illustrates a flow diagram of an example, non-limiting computer-implemented method 1000 that facilitates automatically analyzing one or more conversations between agents and customers using an AWRNNED are provided in accordance with one or more embodiments described herein. Repetitive description of like elements employed in other embodiments described herein is omitted for sake of brevity.

At 1002, method 1000 can comprise obtaining, by a system operatively coupled to a processor, one or more agent-customer conversations (e.g., via a sequence analysis component 302, a conversation analysis component 202, an agent conversation component 104, and/or a computing device 102). At 1004, computer-implemented method 1000 can comprise generating, by the system, respective prepared transcripts of the agent-customer conversations (e.g., via a sequence analysis component 302, a response labeling component 304, a conversation analysis component 202, an agent conversation component 104, and/or a computing device 102). At 1006, computer-implemented method 1000 can comprise training, by the system, an attention weighted recurrent neural network encoder-decoder (AWRNNED) model using the respective prepared transcripts (e.g., via a model generation component 306, a conversation analysis component 202, an agent conversation component 104, and/or a computing device 102). At 1008, computer-implemented method 1000 can comprise generating, by the system, groupings of relationships between agent sentences and customer response sentences of the one or more agent-customer conversations based on learned attention weights of the AWRNNED and/or semantic distance (e.g., via a grouping component 308, a conversation analysis component 202, an agent conversation component 104, and/or a computing device 102).

Figure 11:
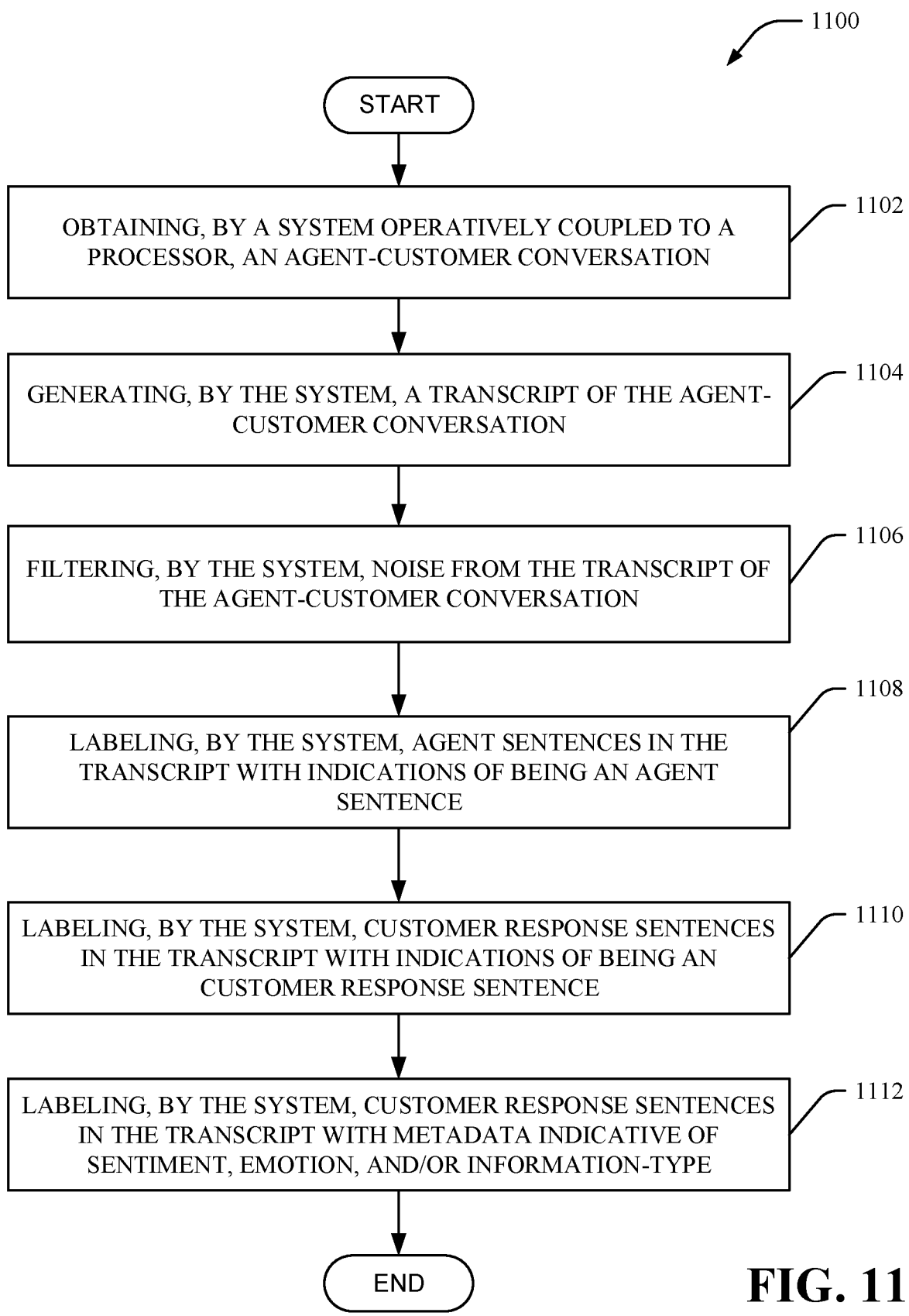
FIG. 11 illustrates a flow diagram of another exemplary, non-limiting computer-implemented method in accordance with one or more embodiments described herein.

FIG. 11 illustrates a flow diagram of an example, non-limiting computer-implemented method 1100 that facilitates automatically generating a prepared transcript in accordance with one or more embodiments described herein. Repetitive description of like elements employed in other embodiments described herein is omitted for sake of brevity.

At 1102, computer-implemented method 1100 can comprise obtaining, by a system operatively coupled to a processor, an agent-customer conversation (e.g., via a sequence analysis component 302, a conversation analysis component 202, an agent conversation component 104, and/or a computing device 102). At 1104, computer-implemented method 1100 can comprise generating, by the system, a transcript of the agent-customer conversation (e.g., via a sequence analysis component 302, a conversation analysis component 202, an agent conversation component 104, and/or a computing device 102). At 1106, computer-implemented method 1100 can comprise filtering, by the system, noise from the transcript of the agent-customer conversation (e.g., via a sequence analysis component 302, a conversation analysis component 202, an agent conversation component 104, and/or a computing device 102). At 1108, computer-implemented method 1100 can comprise labeling, by the system, agent sentences in the transcript with indications of being an agent sentence (e.g., via a sequence analysis component 302, a conversation analysis component 202, an agent conversation component 104, and/or a computing device 102). At 1110, computer-implemented method 1100 can comprise labeling, by the system, customer response sentences in the transcript with indications of being a customer response sentence (e.g., via a sequence analysis component 302, a conversation analysis component 202, an agent conversation component 104, and/or a computing device 102). At 1112, computer-implemented method 1100 can comprise labeling, by the system, customer response sentences in the transcript with metadata indicative of sentiment, emotion, and/or information-type (e.g., via a response labeling component 304, a conversation analysis component 202, an agent conversation component 104, and/or a computing device 102).

Figure 12:
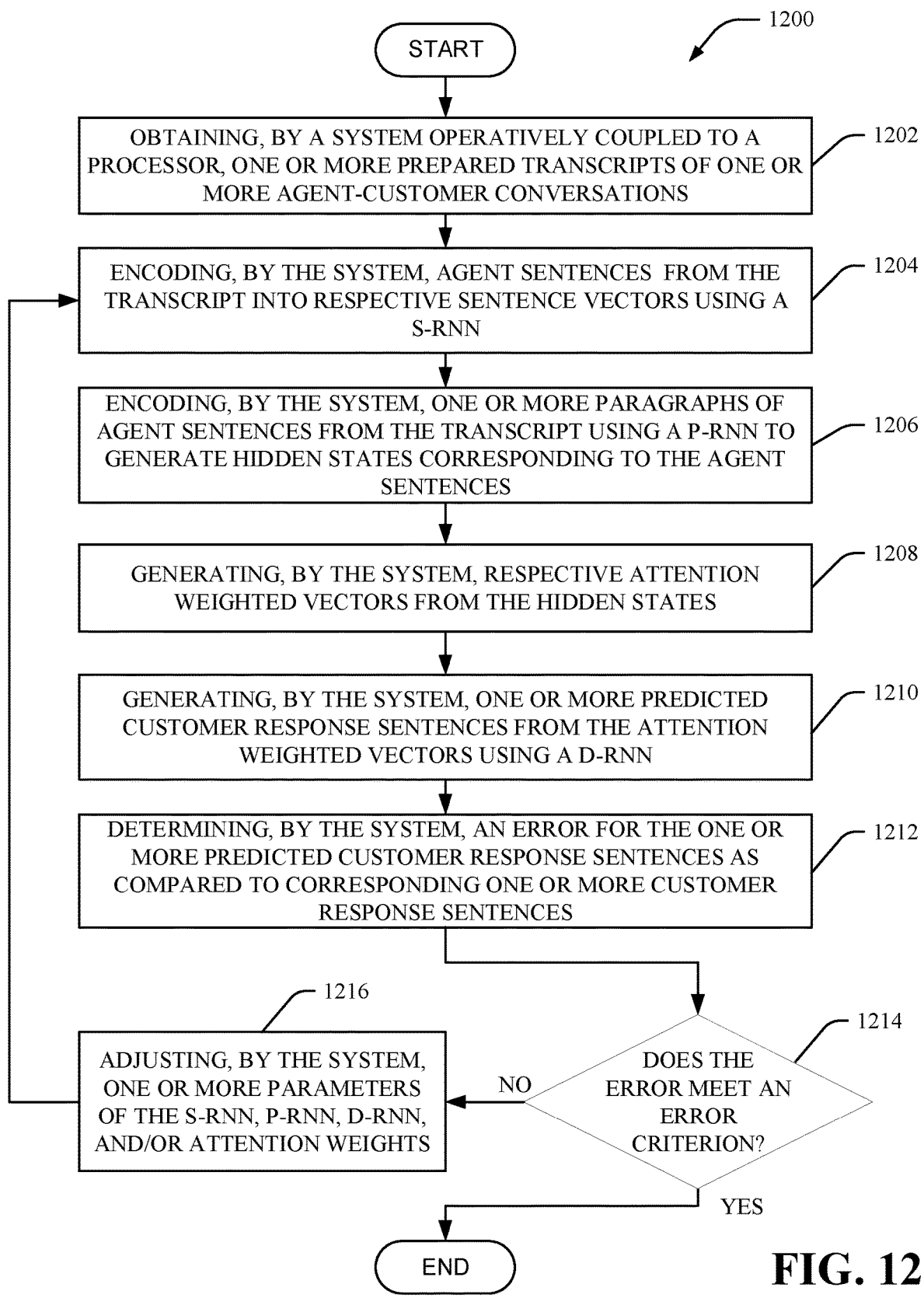
FIG. 12 illustrates a flow diagram of a further example, non-limiting computer-implemented method in accordance with one or more embodiments described herein.

FIG. 12 illustrates a flow diagram of an example, non-limiting computer-implemented method 1200 that facilitates automatically training an attention weighted recurrent neural network encoder-decoder (AWRNNED) model in accordance with one or more embodiments described herein. Repetitive description of like elements employed in other embodiments described herein is omitted for sake of brevity.

At 1202, computer-implemented method 1200 can comprise obtaining, by a system operatively coupled to a processor, one or more prepared transcripts of one or more agent-customer conversations (e.g., via a model generation component 306, a conversation analysis component 202, an agent conversation component 104, and/or a computing device 102). At 1204, computer-implemented method 1200 can comprise encoding, by the system, agent sentences from the transcript into respective sentence vectors using a S-RNN (e.g., via a model generation component 306, a conversation analysis component 202, an agent conversation component 104, and/or a computing device 102). At 1206, computer-implemented method 1200 can comprise encoding, by the system, one or more paragraphs of agent sentences from the transcript using a P-RNN to generate hidden states corresponding to the agent sentences (e.g., via a model generation component 306, a conversation analysis component 202, an agent conversation component 104, and/or a computing device 102). At 1208, computer-implemented method 1200 can comprise generating, by the system, respective attention weighted vectors from the hidden states (e.g., via an attention weighting component 310, a model generation component 306, a conversation analysis component 202, an agent conversation component 104, and/or a computing device 102). At 1210, computer-implemented method 1200 can comprise generating, by the system, one or more predicted customer response sentences from the attention weighted vectors using a D-RNN (e.g., via a model generation component 306, a conversation analysis component 202, an agent conversation component 104, and/or a computing device 102). At 1212, computer-implemented method 1200 can comprise determining, by the system, an error for the one or more predicted customer response sentences as compared to corresponding one or more customer response sentences (e.g., via a model generation component 306, a conversation analysis component 202, an agent conversation component 104, and/or a computing device 102). At 1214, computer-implemented method 1200 can comprise determining, by the system, whether the error meets an error criterion (e.g., via a model generation component 306, a conversation analysis component 202, an agent conversation component 104, and/or a computing device 102). If the determination at 1214 is "NO" meaning that the error does not meet the error criterion, then the computer-implemented method proceeds to 1216. If the determination at 1214 is "YES" meaning that the error does meet the error criterion, then the computer-implemented method ends and the AWRNNED is trained. At 1216, computer-implemented method 1200 can comprise adjusting, by the system, one or more parameters of the S-RNN, P-RNN, D-RNN, and/or attention weights (e.g., via a model generation component 306, a conversation analysis component 202, an agent conversation component 104, and/or a computing device 102).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 13:
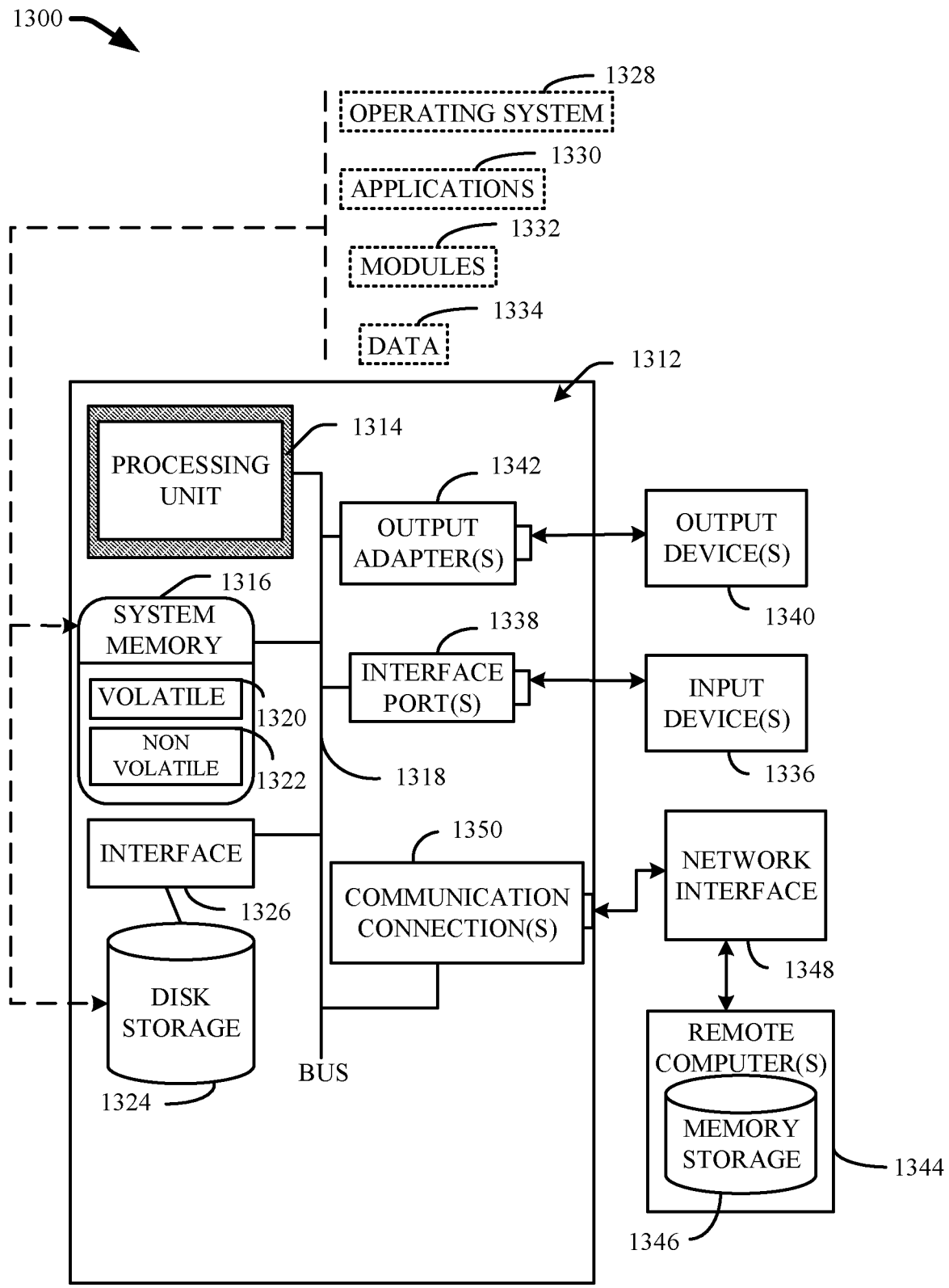
FIG. 13 illustrates a block diagram of an example, non-limiting operating environment in accordance with one or more embodiments described herein.

In order to provide a context for the various aspects of the disclosed subject matter, FIG. 13 as well as the following discussion are intended to provide a general description of a suitable environment in which the various aspects of the disclosed subject matter can be implemented. FIG. 13 illustrates a block diagram of an example, non-limiting operating environment in which one or more embodiments described herein can be facilitated. Repetitive description of like elements employed in other embodiments described herein is omitted for sake of brevity.

With reference to FIG. 13, a suitable operating environment 1300 for implementing various aspects of this disclosure can also include a computer 1312. The computer 1312 can also include a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314. The system bus 1318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1494), and Small Computer Systems Interface (SCSI). The system memory 1316 can also include volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1320 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1312 can also include removable/non-removable, volatile/non-volatile computer storage media. FIG. 13 illustrates, for example, a disk storage 1324. Disk storage 1324 can also include, but is not limited to, devices like a magnetic disk drive, floppy disk drive, tape drive, Jaz drive, Zip drive, LS-100 drive, flash memory card, or memory stick. The disk storage 1324 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1324 to the system bus 1318, a removable or non-removable interface is typically used, such as interface 1326. FIG. 13 also depicts software that acts as an intermediary between users and the basic computer resources described in the suitable operating environment 1300. Such software can also include, for example, an operating system 1328. Operating system 1328, which can be stored on disk storage 1324, acts to control and allocate resources of the computer 1312. System applications 1330 take advantage of the management of resources by operating system 1328 through program modules 1332 and program data 1334, e.g., stored either in system memory 1316 or on disk storage 1324. It is to be appreciated that this disclosure can be implemented with various operating systems or combinations of operating systems. A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port can be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a computer, a server, a router, a network PC, a workstation, a microprocessor based appliance, a peer device or other common network node and the like, and typically can also include many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1350 refers to the hardware/software employed to connect the network interface 1348 to the system bus 1318. While communication connection 1350 is shown for illustrative clarity inside computer 1312, it can also be external to computer 1312. The hardware/software for connection to the network interface 1348 can also include, for exemplary purposes only, internal and external technologies such as, modems including regular telephone grade modems, cable modems and DSL modems, ISDN adapters, and Ethernet cards.

In an embodiment, for example, computer 1312 can perform operations comprising: in response to receiving a query, selecting, by a system, a coarse cluster of corpus terms having a defined relatedness to the query associated with a plurality of coarse clusters of corpus terms; determining, by the system, a plurality of candidate terms from search results associated with the query; determining, by the system, at least one recommended query term based on refined clusters of the coarse cluster, the plurality of candidate terms, and the query; and communicating at least one recommended query term to a device associated with the query.

It is to further be appreciated that operations of embodiments disclosed herein can be distributed across multiple (local and/or remote) systems.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products, and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
  a memory that stores computer executable components;
  a processor, operably coupled to the memory, and that executes computer executable components stored in the memory, wherein the computer executable components comprise:
    a model generation component that trains an attention weighted recurrent neural network encoder-decoder (AWRNNED) using an iterative process based on one or more paragraphs of agent sentences from respective transcripts of one or more conversations between one or more human agents and one or more human customers, and based on one or more customer response sentences from the respective transcripts, wherein the AWRNNED comprises a sentence encoder recurrent neural network (S-RNN) that encodes respective agent sentences of the one or more paragraphs, and comprises a paragraph encoder recurrent neural network (P-RNN) that encodes respective paragraphs of the one or more paragraphs based on at least one output from the S-RNN; and
    a grouping component that generates one or more groups respectively comprising one or more agent sentences and one or more customer response sentences selected based on attention weights of the AWRNNED; and
    a recommendation component that generates, during an ongoing conversation between a human agent and a human customer, a recommendation, to the human agent, of an agent sentence that the human agent should avoid saying to prevent a particular customer response sentence, based upon an analysis of the ongoing conversation using the trained AWRNNED.

2. The system of claim 1, wherein the computer executable components further comprise a sequence component that:
  generates the respective transcripts of the one or more conversation;
  labels agent sentences in the respective transcripts with an agent indication; and
  labels customer response sentences in the respective transcripts with a customer response sentence indication.

3. The system of claim 1, wherein the computer executable components further comprise a response labeling component that labels respective customer response sentences in the respective transcripts with one or more indications selected from the group consisting of sentiment, emotion, and information-type.

4. The system of claim 1, wherein the modeling component further:
  generates, during the iterative process, respective sentence vectors from the one or more agent sentences using the S-RNN;
  generates, during the iterative process, respective hidden states from sentence vectors associated with one or more agent sentences of the one or more paragraphs of agent sentences using the P-RNN; and
  generating, during the iterative process, attention weighted vectors based on the hidden states.

5. The system of claim 1, wherein the modeling component further:
  generates, during the iterative process, one or more predicted customer response sentences using a decoder recurrent neural network (D-RNN) and attention weighted vectors associated with the one or more agent sentences; and;
  determines, during the iterative process, an error based on a comparison of the one or more predicted customer response sentences and the one or more customer response sentences; and
  in response to a determination that the error does not meet an error criterion, modifies, during the iterative process, one or more parameters of at least one of the S-RRN, P-RNN, D-RNN, or attention weights, and repeat the iterative process.

6. The system of claim 1, wherein the human agent is a customer support agent.

7. The system of claim 1, wherein the recommendation component further generates, during the ongoing conversation, another recommendation to the human agent, of another agent sentence to employ to elicit another particular customer response sentence based upon the analysis of the ongoing conversation using the trained AWRNNED.

8. A computer-implemented method, comprising:
   training, by a system operatively coupled to a processor, an attention weighted recurrent neural network encoder-decoder (AWRNNED) using an iterative process based on one or more paragraphs of agent sentences from respective transcripts of one or more conversations between one or more human agents and one or more human customers, and based on one or more customer response sentences from the respective transcripts, wherein the AWRNNED comprises a sentence encoder recurrent neural network (S-RNN) that encodes respective agent sentences of the one or more paragraphs, and comprises a paragraph encoder recurrent neural network (P-RNN) that encodes respective paragraphs of the one or more paragraphs based on at least one output from the S-RNN;
   generating, by the system, one or more groups respectively comprising one or more agent sentences and one or more customer response sentences selected based on attention weights of the AWRNNED; and
   generating, by the system, during an ongoing conversation between a human agent and a human customer, a recommendation, to the human agent, of an agent sentence that the human agent should avoid saying to prevent a particular customer response sentence, based upon an analysis of the ongoing conversation using the trained AWRNNED.

9. The computer-implemented method of claim 8, further comprising:
   generating, by the system, the respective transcripts of the one or more conversation;
   labeling, by the system, agent sentences in the respective transcripts with an agent indication; and
   labeling, by the system, customer response sentences in the respective transcripts with a customer response sentence indication.

10. The computer-implemented method of claim 8, further comprising labeling, by the system, respective customer response sentences in the respective transcripts with one or more indications selected from the group consisting of sentiment, emotion, and information-type.

11. The computer-implemented method of claim 8, further comprising:
   generating, by the system during the iterative process, respective sentence vectors from the one or more agent sentences using the S-RNN;
   generating, by the system during the iterative process, respective hidden states from sentence vectors associated with one or more agent sentences of the one or more paragraphs of agent sentences using the P-RNN; and
   generating, by the system, during the iterative process, attention weighted vectors based on the hidden states.

12. The computer-implemented method of claim 8, further comprising:
   generating, by the system during the iterative process, one or more predicted customer response sentences using a decoder recurrent neural network (D-RNN) and attention weighted vectors associated with the one or more agent sentences;
   determining, by the system during the iterative process, an error based on a comparison of the one or more predicted customer response sentences and the one or more customer response sentences; and
   in response to a determination that the error does not meet an error criterion, modifying, by the system during the iterative process, one or more parameters of at least one of the S-RRN, P-RNN, D-RNN, or attention weights, and repeat the iterative process.

13. The computer-implemented method of claim 8, wherein the human agent is a salesperson.

14. The computer-implemented method of claim 8, further comprising generating, by the system during the ongoing conversation, another recommendation to the human agent, of another agent sentence to employ to elicit another particular customer response sentence based upon the analysis of the ongoing conversation using the trained AWRNNED.

15. A computer program product for training an attention weighted recurrent neural network encoder-decoder (AWRNNED), the computer program product comprising a computer readable storage medium having program instructions embodied therewith, the program instructions executable by a processor to cause the processer to:
   train the AWRNNED using an iterative process based on one or more paragraphs of agent sentences from respective transcripts of one or more conversations between one or more human agents and one or more human customers, and based on one or more customer response sentences from the respective transcripts, wherein the AWRNNED comprises a sentence encoder recurrent neural network (S-RNN) that encodes respective agent sentences of the one or more paragraphs, and comprises a paragraph encoder recurrent neural network (P-RNN) that encodes respective paragraphs of the one or more paragraphs based on at least one output from the S-RNN;
   generate one or more groups respectively comprising one or more agent sentences and one or more customer response sentences selected based on attention weights of the AWRNNED; and
   generate, during an ongoing conversation between a human agent and a human customer, a recommendation, to the human agent, of an agent sentence that the human agent should avoid saying to prevent a particular customer response sentence, based upon an analysis of the ongoing conversation using the trained AWRNNED.

16. The computer program product of claim 15, wherein the program instructions executable by the processor to further cause the processor to:
   generate the respective transcripts of the one or more conversation;
   label agent sentences in the respective transcripts with an agent indication; and
   label customer response sentences in the respective transcripts with a customer response sentence indication.

17. The computer program product of claim 15, wherein the program instructions executable by the processor to further cause the processor to:
   label respective customer response sentences in the respective transcripts with one or more indications selected from the group consisting of sentiment, emotion, and information-type.

18. The computer program product of claim 15, wherein the program instructions executable by the processor to further cause the processor to:
  generate, during the iterative process, respective sentence vectors from the one or more agent sentences using the S-RNN;
  generate, during the iterative process, respective hidden states from sentence vectors associated with one or more agent sentences of the one or more paragraphs of agent sentences using the P-RNN; and
  generate, during the iterative process, attention weighted vectors based on the hidden states.

19. The computer program product of claim 15, wherein the program instructions executable by the processor to further cause the processor to:
  generate, during the iterative process, one or more predicted customer response sentences using a decoder recurrent neural network (D-RNN) and attention weighted vectors associated with the one or more agent sentences;
  determine during the iterative process, an error based on a comparison of the one or more predicted customer response sentences and the one or more customer response sentences; and
  in response to a determination that the error does not meet an error criterion, modify, during the iterative process, one or more parameters of at least one of the S-RRN, P-RNN, D-RNN, or attention weights, and repeat the iterative process.

20. The computer program product of claim 15, wherein the program instructions executable by the processor to further cause the processor to:
  generate, during the ongoing conversation, another recommendation to the human agent, of another agent sentence to employ to elicit another particular customer response sentence based upon the analysis of the ongoing conversation using the trained AWRNNED.

* * * * *